United States Patent [19]

Soma et al.

[11] Patent Number: 4,795,724
[45] Date of Patent: Jan. 3, 1989

[54] SILICON NITRIDE SINTERED BODIES AND PROCESS FOR MANUFACTURING THE SAME

[75] Inventors: Takao Soma, Nagoya; Tomonori Takahashi, Chita, both of Japan

[73] Assignee: NGK Insulators, Ltd., Aichi, Japan

[21] Appl. No.: 58,115

[22] Filed: Jun. 4, 1987

[30] Foreign Application Priority Data

Jun. 12, 1986 [JP] Japan ............................. 61-135013
Feb. 13, 1987 [JP] Japan ............................. 62-29919

[51] Int. Cl.$^4$ ............................................. C04B 35/58
[52] U.S. Cl. ........................................ 501/98; 501/96; 501/97; 264/65
[58] Field of Search .............. 501/97, 98, 96; 264/65

[56] References Cited

U.S. PATENT DOCUMENTS

| | | | |
|---|---|---|---|
| 4,234,343 | 11/1980 | Andersson | 501/98 |
| 4,511,525 | 4/1985 | Tsuge et al. | 501/97 |
| 4,535,063 | 8/1985 | Matsuhiro et al. | 501/97 |

FOREIGN PATENT DOCUMENTS

| | | | |
|---|---|---|---|
| 48-7486 | 3/1973 | Japan . | |
| 49-21091 | 5/1974 | Japan . | |
| 52-057100 | 5/1977 | Japan | 501/97 |
| 55-3397 | 1/1980 | Japan . | |
| 59-35867 | 8/1984 | Japan . | |
| 59-174577 | 10/1984 | Japan | 501/97 |
| 61-058863 | 3/1986 | Japan | 501/97 |

OTHER PUBLICATIONS

Effect of Crystallizing the Grain-Boundary Glass Phase on the High-Temperature Strength of Hot-Pressed $Si_3N_4$ Containing $Y_2O_3$, Tsuge et al., J. Amer. Ceram. Soc. 58, 323–326 (1975).
Japanese Industrial Standard, "Testing Method for Flexural Strength (Modulus of Rupture) of High Performance Ceramics", JIS R 1601–1981 JCPDS Card 30-1462.
In Re Durden 226, USPQ 359.

*Primary Examiner*—Ferris H. Lander
*Assistant Examiner*—Anthony Green
*Attorney, Agent, or Firm*—Parkhurst, Oliff & Berridge

[57] ABSTRACT

Silicon nitride sintered bodies are disclosed, which each consist essentially of Si, O, N, and at least two kinds of rare earth elements selected from Y, Er, Tm, Yb, and Lu the bodies comprising not less than 70% by weight of $Si_3N_4$. The ratio of the molar amount of all the rare earth elements contained in the sintered body calculated as moles of $Ln_2O_3$, Ln being a rare earth element selected from Y, Er. Tm, Yb and Lu divided by the molar amount of oxygen calculated as moles of $SiO_2$ is within the range of from 0.4 to 1.3. The amount of oxygen calculated as moles of $SiO_2$ is obtained by subtracting the amount of oxygen contained in all the $Ln_2O_3$, all the rare earth elements contained in said sintered body being considered as molecules of $Ln_2O_3$ from the amount of oxygen contained in the sintered body and converting the remaining amount of oxygen into moles of $SiO_2$. Any one of the rare earth elements contained in the sintered body accounts for not more than 95 mol % of all the rare earth elements contained in the sintered body. An intergranular phase of $Si_3N_4$ grains contained in the sintered body is substantially of a crystalline phase and not less than 50% of the crystalline phase of the intergranular phase is a crystalline phases of an apatite structure. A process for manufacturing such silicon nitride sintered bodies is also disclosed.

5 Claims, 2 Drawing Sheets

Diffraction Angle (2θ)

FIG_1
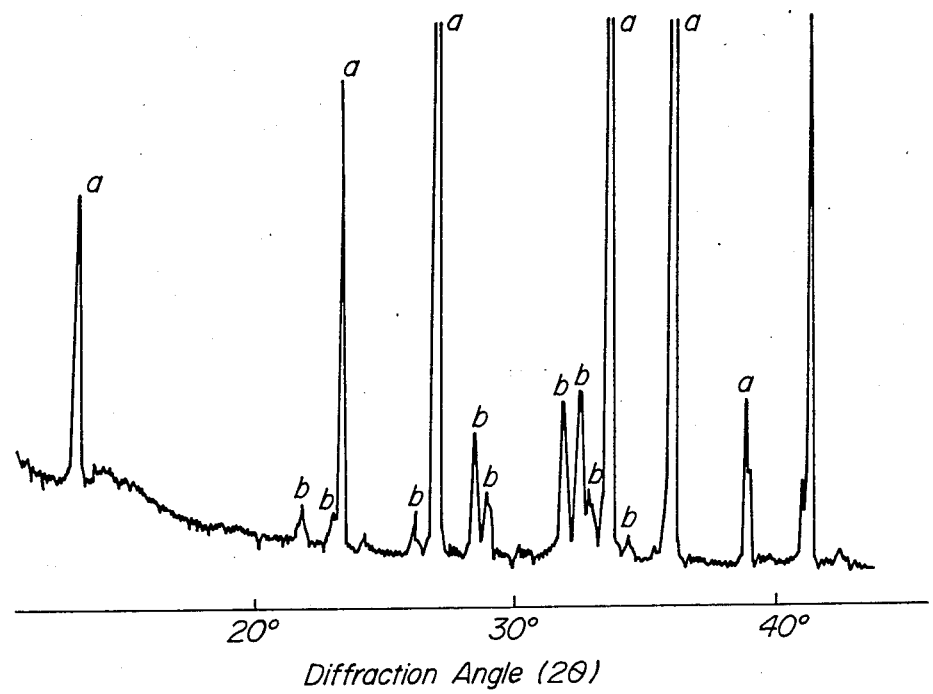

FIG_2a
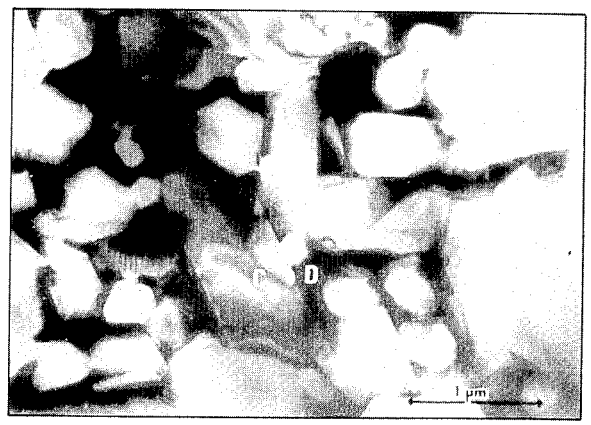
FIG_2b
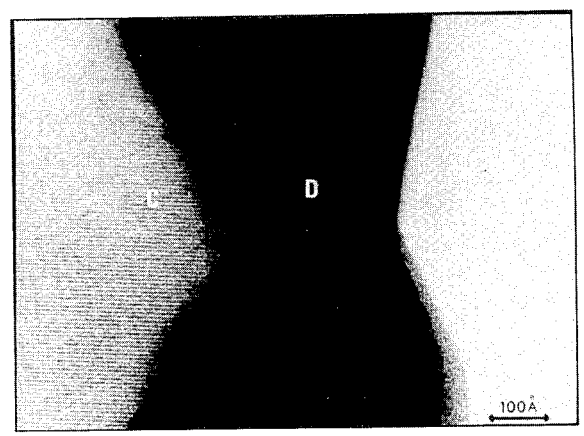

SILICON NITRIDE SINTERED BODIES AND PROCESS FOR MANUFACTURING THE SAME

BACKGROUND OF THE INVENTION (1) Field of the Invention

The present invention relates to silicon nitride sintered bodies having high strength at high temperatures and a process for manufacturing such sintered bodies through sintering at atmospheric pressure or sintering under a pressurized atmosphere.

(2) Related Art Statement

Heretofore, silicon nitride sintered bodies to which is added an oxide of an element in Group $III_a$ including a rare earth oxide or oxides as well as processes for manufacturing such sintered bodies have been proposed. For instance, Japanese Patent Publication No. 48-7,486 discloses a process for manufacturing silicon nitride sintered bodies, which comprises mixing not less than 85 mol% of $Si_3N_4$ and not more than 15 mol% of at least one kind of an oxide selected from the oxides of elements in Group $III_a$, molding the resulting mixture and then sintering the molding in a non-oxidative atmosphere. Japanese Patent Publication No. 49-21,091 discloses silicon nitride sintered bodies consisting of at least 50% by weight of $Si_3N_4$, not more than 50% by weight of at least one kind of an oxide selected from $Y_2O_3$, and oxides of La series elements, and from 0.01 to 20% by weight of $Al_2O_3$.

However, silicon nitride sintered bodies having high strength at high temperatures cannot be obtained merely by adding a rare earth element or elements into silicon nitride. Although densification is promoted by the addition of $Al_2O_3$ to $Si_3N_4$, an intergranular phase has a low softening point so that strength at high temperatures is largely lowered.

As processes for producing silicon nitride sintered bodies having high strength at high temperatures, for instance, Japanese Patent Publication No. 59-35,867 discloses a method for producing silicon nitride sintered bodies in which not less than 2% by weight of $La_2O_3$ and not less than 2% by weight of $Y_2O_3$ are added in a total amount of not less than 10% by weight. Japanese Patent Application Laid-open No. 55-3,397 discloses a process for manufacturing silicon nitride sintered bodies in which an intergranular phase is crystallized by adding $SiO_2$ and an oxide or oxides of a rare earth element or elements.

Further, U.S. Pat. No. 4,234,343 discloses silicon nitride sintered bodies which contain Yb, Y, Er or Dy and Sc, Al, Cr, Ti, etc. and in which an intergranular phase is crystallized into $Si_2N_2O$ and $M_2Si_2O_7$ (in which M is Yb, Y, Er, Dy, Sc, Al, Co or Ti).

As silicon nitride sintered bodies having high density and high strength which can be produced by a pressureless sintering process, i.e., sintering at atmospheric pressure, enabling sintering of complicated shapes of green bodies, for instance, Japanese Patent Application Laid-open No. 59-174,577 discloses silicon nitride sintered bodies to which from 5 to 30% by weight of two or more kinds of oxides selected from oxides of Sc, Y, La, Ce, Pr, Nd, Pm, Sm, Eu, Gd, Tb, Dy, Ho, Er, Tm, Yb, and Lu are added.

However, in any of the above-mentioned conventional techniques, although silicon nitride sintered bodies having high strength at high temperatures can be obtained by hot pressing, silicon nitride sintered bodies having such high strength at high temperatures as obtained in the case of the hot pressing cannot be obtained by pressureless sintering or sintering under a pressurized atmosphere and high strength exceeding 500 MPa at high temperatures of around 1,400° C. cannot be expected.

SUMMARY OF THE INVENTION

It is an object of the present invention to obviate the above-mentioned problems, and to provide silicon nitride sintered bodies having high strength even at high temperatures (1,400° C.) and a process for manufacturing such silicon nitride sintered bodies through pressureless sintering or sintering under a pressurized atmosphere which enables green bodies of complicated shapes to be fired.

According to an aspect of the present invention, there is provided silicon nitride sintered bodies consisting essentially of Si, O, N and at least two kinds of rare earth elements selected from the group consisting of Y, Er, Tm, Yb, and Lu, the bodies comprising not less than 70% by weight of $Si_3N_4$; wherein (1) the ratio of the molar amount of all the rare earth elements contained in said sintered body when calculated as moles of $Ln_2O_3$ of Ln being a rare element selected from Y, Er, Tm, Yb, and Lu divided by the molar amount of oxygen calculated as moles of $SiO_2$ is within the range of from 0.4 to 1.3, said molar amount of oxygen calculated as moles of $SiO_2$ being obtained by subtracting the amount of oxygen contained in the $Ln_2O_3$, all the rare earth elements contained in said sintered body being considered as molecules of $Ln_2O_2$ from the amount of oxygen contained in said sintered body and converting the remaining amount of oxygen into moles of $SiO_2$; (2) any one of the rare earth elements contained in said sintered body accounting for not more than 95 mol% of all the rare earth elements contained in the sintered body; and (3) an intergranular phase of $Si_3N_4$ grains contained in said sintered body is substantially of a crystalline phase and not less than 50% of the crystalline phase of the intergranular phase is a crystalline phase of an apatite structure.

According to another aspect of the present invention, there is provided a process for manufacturing silicon nitride sintered bodies, which comprises preparing a mixed powder consisting of a raw material powder of silicon nitride and two or more kinds of rare earth element oxides selected from the group consisting of $Y_2O_3$, $Er_2O_3$, $Tm_2O_3$, $Yb_2O_3$, and $Lu_2O_3$, molding said mixed powder, and then firing the thus obtained molding at 1,700° C. to 2,100° C. at atmospheric pressure or under a pressurized $N_2$ atmosphere, wherein any one of said selected rare earth element oxides is not more than 95 mol% of the total addition amount of the oxides of the rare earth elements and the ratio of the total addition molar amount of the selected oxides of the rare earth elements divided by the molar amount of $SiO_2$, obtained by calculating as $SiO_2$ all oxygen contained in said sintered body excluding oxygen introduced into the sintered body from the added rare earth element oxides is within the range of from 0.4 to 1.3.

According to the present invention, silicon nitride sintered bodies having high strength of not less than 500 MPa at high temperatures (1,400° C.) can be obtained through sintering at atmospheric pressure or sintering under a pressurized atmosphere.

These and other objects, features and advantages of the invention will be appreciated upon reading the following description of the invention when taken in conjunction with attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 1 is a diagram showing a diffraction pattern of Sample No. 3 of the silicon nitride sintered bodies according to the present invention in an X-ray diffraction analysis by using a Cu-K$\alpha$ line; and FIGS. 2(a) and 2(b) are microphotographs of a transmission electron microscope showing crystalline structures of Sample No. 3 of the silicon nitride sintered bodies according to the present invention.

DETAILED DESCRIPTION OF THE INVENTION

In the above-mentioned construction, the densification of the silicon nitride sintered body is promoted by incorporating in the silicon nitride sintered body at least two kinds of oxides of rare earth elements having smaller cation radii ($Er_2O_3$, $Y_2O_3$, $Tm_2O_3$, $Yb_2O_3$, and $Lu_2O_3$) among the rare earth elements, preferably 50 to 95 mol% of $Yb_2O_3$ with respect to the total addition amount of oxides of the rare earth elements, more preferably $Y_2O_3$ and $Yb_2O_3$. Although some densification-promoting effect is obtained even when a rare earth element or elements having larger cation radii are used, strength at high temperatures (1,400° C.) is not high. This is because the crystalline intergranular phase of the apatite structure containing the rare earth element or elements having the larger cation radii have different properties from those of the crystalline intergranular phase of the apatite structure containing the rare earth elements having smaller cation radii.

The reason the amount of any one of the oxides of the rare earth elements is restricted to not more than 95 mol% of the total addition amount of the oxides of the rare earth elements is that liquid phases obtained by mixing two kinds of the rare earth element oxides outside the above range do not exhibit densification resulting from a decreased eutetic point, an increased wettability or a lowered viscosity. As a result dense silicon nitride sintered bodies cannot be obtained. The silicon nitride sintered bodies preferably contain at least $Yb_2O_3$, the addition amount of $Yb_2O_3$ being preferably from 50 to 95 mol% with respect to the total addition amount of the oxides of the rare earth elements. More preferably, $Y_2O_3$ and $Yb_2O_3$ are provided in a molar ratio of $Y_2O_3/Yb_2O_3 = 50/50$ to $5/95$.

The reason the total addition molar amount of the oxides of the rare earth elements is determined such that the ratio of the total addition molar amount of the oxides of the rare earth elements to the molar amount of $SiO_2$, calculated by converting oxygen contained in the sintered body (excluding oxygen introduced thereinto through the addition of the oxides of the rare earth oxides) as $SiO_2$ is from 0.4 to 1.3 is that when the oxides or the rare earth elements are added to stay within the above range, the intergranular liquid phase having a densifying effect can be obtained and the intergranular phase can be substantially converted to the crystalline phase having the apatite structure. If the ratio exceeds 1.3, the intergranular liquid phase having the densifying effect cannot be obtained and much $Ln_4Si_2O_7N_2$ (wherein Ln denotes a rare earth element) is contained in the crystalline phase. On the other hand, if the ratio is less than 0.4, although the intergranular liquid phase having the densifying effect can be obtained, $Ln_2Si_2O_7$ (Ln: a rare earth element) is contained in the crystalline phase, so that sintered bodies having high strength at high temperatures cannot be obtained. In order that the sintered bodies may be densified to have high strength at high temperatures, it is necessary that at least the intergranular phase of the $Si_3N_4$ is substantially composed of a crystalline phase and at least 50% of the intergranular phase is a crystalline phase of the apatite structure. Preferably, it is desirable that substantially all the intergranular phase is the crystalline phase of the apatite structure. More preferably, the above molar ratio is from 0.5 to 1.2.

The crystalline phase of the apatite structure is a crystalline phase having the same crystalline structure as that of hexagonal system crystals having a chemical formula: $Y_{10}(SiO_4)_6N_2$ represented by a JCPDS card 30-1462. In the case of sintered bodies to which not less than two kinds of rare earth elements are added and mixed, lattice sites occupied by Y ions in the $Y_{10}(SiO_4)_6N_2$ crystals are replaced by rare earth element ions. The two or more kinds of rare earth elements are completely dissolved. It perhaps is the case that lattice sites of N are replaced by O and the lattice sites of Y are vacant to maintain electrical neutrality. FIG. 1 shows an X-ray diffraction pattern of a sintered body obtained according to the present invention. In FIG. 1, diffraction peaks shown by "a" are attributable to $\beta$-$Si_3N_4$, and diffraction peaks shown by "b" are those of a crystalline phase of the apatite structure as the intergranular crystalline phase. In the crystalline phase of the apatite structure, depending upon the size of the cations, the volume of a lattice varies and the locations of the X-ray peaks shift, but the crystalline phase is identified by the X-ray diffraction pattern.

The amount of $SiO_2$ is determined based on consideration of the amount of oxygen contained in powdery raw material of silicon nitride and the amount of oxygen introduced through oxidation of $Si_3N_4$ during the preparation of the sintered body. The amount of $SiO_2$ is obtained by determining the amount of oxygen in the sintered body through a chemical analysis and subtracting the amount of oxygen incorporated into the sintered body through the addition of the oxides of the rare earth elements from the thus determined oxygen amount, and converting the amount of oxygen remaining to the amount of $SiO_2$. For this reason, when a silicon nitride raw material powder containing a smaller amount of oxygen, a silicon nitride raw material powder to which $SiO_2$ is separately added, or a powder in which the amount of oxygen is increased by calcining a raw material powder is used, or when the amount of oxygen introduced is increased or decreased by modifying the preparation method, the sintered bodies according to the present invention can be obtained by increasing or decreasing the addition amount of the oxides of the rare earth elements depending upon the amount of $SiO_2$.

The amount of $SiO_2$ is preferably from 1.0 to 5.0% by weight to obtain densification. If it is less than 1.0% by weight, the total addition amount of the oxides of the rare earth elements is so small that the amount of liquid phase is insufficient for the densification. On the other hand, if it is more than 5.0% by weight, the intergranular phase becomes excessive so that the strength at high temperatures becomes extremely low and the intrinsic strength characteristics of the silicon nitride sintered bodies are not attained due to the smaller amount of silicon nitride.

The manufacturing method according to the present invention is as follows:

First, a mixture is obtained by preparing and mixing a powdery raw material of $Si_3N_4$ and an additive consisting of not less than two kinds of oxides of rare earth elements selected from $Y_2O_3$, $Er_2O_3$, $Tm_2O_3$, $Yb_2O_3$, and $Lu_2O_3$ as desired. If necessary, the silicon nitride raw material powder is oxidized to increase the amount of $SiO_2$ or a separately prepared powder of $SiO_2$ is added thereto. Needless to say, it is preferable that the silicon nitride raw material powder is of a high purity containing not more than 0.5% by weight of impurities of metallic or cationic elements. Metallic impurities such as Al, Fe, Mg, etc. interrupt the crystallization of the intergranular phase and decrease the strength at high temperatures. The composition of the mixture is adjusted such that none of the selected oxides of the rare earth elements is present in an amount greater than 95 mol% of the total addition amount of the oxides of the rare earth elements and that the total addition amount of the selected oxides of the rare earth elements is 0.4 to 1.3 times the molar amount of $SiO_2$ obtained by converting oxygen contained in the sintered body (excluding the oxygen introduced thereinto through the addition of the oxides of the rare earth elements). The oxides of the rare earth elements, $Y_2O_3$, $Er_2O_3$, $Tm_2O_3$, $Yb_2O_3$ and $Lu_2O_3$ may be added in the form of a solid solution such as $(Y,Yb)_2O_3$. Alternatively, they may be added in form of a compound such as a hydroxide, a nitrate, a nitride or the like which is converted into an oxide until the sintering and densification are started through firing. However, they may be preferably added in form of an oxide because the densification is interrupted by the generation of a volatile component or control of the amount of oxygen contained in the sintered body becomes unstable. Then, the thus obtained mixture is molded in a desired shape according to a slip casting, an injection molding, a press molding or the like.

The thus obtained molding is fired at a temperature from 1,700° to 2,100° C. and preferably from 1,900° to 2,000° C. under atmospheric pressure or in a pressurized $N_2$ atmosphere. The firing temperature is limited to 1,700° C. to 2,100° C. because 1,700° C. or more is necessary to obtain sufficient densification for aquiring the intergranular phase having a high melting point, while if the firing temperature exceeds 2,100° C., a specific component is conspicuously evaporated from the sintered body even under the pressurized $N_2$ atmosphere.

Further, in order to restrain the decomposition of silicon nitride during the sintering, the $N_2$ pressure in the firing atmosphere preferably increased. It is preferable that the pressure is not less than 2 atm, not less than 7 atm, and not less than 20 atm at 1,800° C., 1,900° C. and 2,000° C., respectively. Alternatively, it is possible to fire the molding in a powder bed. Preferably, firing is carried out at a temperature from 1,900° C. to 2,000° C. with an $N_2$ atmosphere of 9 to 100 atm.

Further, an excellent fired surface of the sintered body can be obtained by increasing the oxygen partial pressure with addition of CO or $CO_2$ to the atmospheric $N_2$. During the temperature-descending step in this firing, the intergranular phase is substantially crystallized, so that a silicon nitride sintered crystalline body can be obtained in which not less than 50% of the intergranular phase, preferably substantially all the intergranular phase, is converted to a crystalline phase of the apatite structure. In addition to the above crystallization during the temperature-descending step, the crystallization may be performed through reheating, if necessary. In this case, the reheating is preferably done at a temperature from 1,200° C. to 1,500° C.

A silicon nitride sintered body having a composition in accordance with the present invention may be densified through a hot pressing, or a hot isostatic pressing to obtain silicon nitride sintered bodies having high strength at high temperatures.

Further, it is possible that silicon nitride sintered bodies having a composition in accordance with the present invention may be obtained by firing at atmospheric pressure or in a pressurized $N_2$ atmosphere, densifying, promoting densifying through hot isostatic pressing without crystallization during the temperature-descending step in the firing, and crystallizing the intergranular phase during the temperature-descending step in the hot isostatic pressing or during reheating, thereby improving the characteristics.

However, the present invention is characterized in that the densification is effected by sintering under atmospheric pressure or in the pressurized $N_2$ atmosphere so that sintered bodies having high strength at high temperatures can be obtained.

As mentioned above, according to the silicon nitride sintered bodies and the manufacturing process thereof in accordance with the present invention, silicon nitride sintered bodies having high strength at high temperatures are obtained by sintering under atmospheric pressure or a pressurized atmosphere through controlling the oxides of the rare earth elements in a range in which the molar ratio between the rare earth element oxides and $SiO_2$ is specified and by controlling the densificaiton due to the intergranular phase having the limited composition and the crystalline phase during the crystallization.

In the following, specific examples of the present invention will be explained below. These examples are merely given as illustrations of the invention, but should not be interpreted as limiting the scope of the invention.

EXAMPLE 1

A raw material powder of $Si_3N_4$ containing 0.5% by weight of metallic or cationic element impurities such as C, Al, Fe, Mg, Ca, etc. and 1.7% by weight of oxygen and having an average grain size of 0.6 μm and a BET spcific surface area of 22 $m^2/g$ and an additive shown in Table 1(a) having a purity of 99.9% by weight and an average grain size of 0.3 to 2 μm were mixed as shown in Table 1(a). Then, by using a nylon vessel of an inner volume of 1.2 liters, 200 g of a thus formulated raw material were added with 1.2 kg of grinding media made of a silicon nitride base procelain and 500 ml of water, which was milled at a vibration frequency of 1,200 time/minute for 10 hours in a vibration mill. Thereafter, the water was evaporated and a thus milled powder was granulated into a grain size of 100 μm, thereby obtaining a molding powder. Then, the molding powder was isostatically pressed at a pressure of 3 tons/$cm^2$ to obtain a molding of 60×60×6 mm. The molding was fired under firing conditions shown in Table 1(a), and then crystallized at 1,400° C. for 6 hours, thereby obtaining silicon nitride sintered body Nos. 1 through 9 according to the present invention. The same raw material was used, and an additive was added thereinto as shown in Table 1(b). The thus formulated powder was similarly subjected to milling, granulating, molding, firing under firing conditions as in Table 1(b), and crystallization, thereby obtaining similarly crystallized silicon nitride sintered body Nos. 10 to 17 as Comparative Examples.

With respect to the above sintered body Nos. 1–17, the content of oxygen was determined by a chemical analysis, and the amount of oxygen introduced into the sintered body by addition of the additive of the oxides of the rare earth elements was subtracted from the thus determined content of oxygen. The remaining amount of oxygen was converted to a molar amount of $SiO_2$, and the molar ratio between the addition amount of the rare earth element oxides and the amount of $SiO_2$ are shown in Tables 1(a) and 1(b). As a result of the chemical analysis, it was revealed that the analyzed amounts of the rare earth elements did not differ from the addition amount thereof. The bulk densities of the sintered bodies, the crystalline phase of the intergranular phase, and four point bending strengths at room temperature and 1,400° C. are shown in Tables 1(a) and 1(b). The bulk densities of the sintered bodies were measured according to the Archimedean method. The four point bending strengths were measured according to the "Fine ceramic bending strength-testing method" specified in JIS R-1601. The intergranular crystalline phase was determined from results of the X-ray diffraction using the Cu-Kα line. In Tables 1(a) and 1(b), H and S mean the crystals of an apatite structure and $Ln_2Si_2O_7$ (Ln is a rare earth element), respectively. A diffraction pattern in the X-ray diffraction analysis by using the Cu-Kα line is shown in FIG. 1 with respect to the silicon nitride sintered body No. 3 according to the present invention. Among diffraction peaks, those shown by "a" are attributable to $\beta$-$Si_3N_4$ and the peaks represented by "b" are those of the crystalline phase of the apatite structure.

Transmission electron microscope photographs of the silicon nitride sintered body No. 3 according to the present invention are shown in FIGS. 2(a) and 2(b), in which C and D-zones show grains of $Si_3N_4$ and an intergranular phase, respectively.

TABLE 1

| No. | | Additive ① | ② | ③ | Addition amount (wt %) ①:②:③ | Molar ratio ①/② | Molar ratio (① + ② + ③)/ $SiO_2$ |
|---|---|---|---|---|---|---|---|
| Present invention | 1 | $Y_2O_3$ | $Yb_2O_3$ | | 5:5 | 65/35 | 0.6 |
| | 2 | $Y_2O_3$ | $Er_2O_3$ | | 4:4 | 65/35 | 0.4 |
| | 3 | $Y_2O_3$ | $Yb_2O_3$ | | 4:5 | 60/40 | 0.5 |
| | 4 | $Er_2O_3$ | $Yb_2O_3$ | | 8:5 | 60/40 | 0.6 |
| | 5 | $Y_2O_3$ | $Tm_2O_3$ | | 3:5 | 50/50 | 0.5 |
| | 6 | $Yb_2O_3$ | $Lu_2O_3$ | | 7:5 | 60/40 | 0.6 |
| | 7 | $Y_2O_3$ | $Yb_2O_3$ | $Er_2O_3$ | 4:5:1 | **55/40/5 | 0.5 |
| | 8 | $Y_2O_3$ | $Er_2O_3$ | | 7:4 | 75/25 | 0.6 |
| | 9 | $Y_2O_3$ | $Yb_2O_3$ | | 6:10 | 50/50 | 1.3 |
| Comparative Example | 10 | $Y_2O_3$ | $Nd_2O_3$ | | 5:5 | 60/40 | 0.6 |
| | 11 | $Y_2O_3$ | $Dy_2O_3$ | | 5:5 | 60/40 | 0.6 |
| | 12 | $Y_2O_3$ | $La_2O_3$ | | 5:5 | 60/40 | 1.0 |
| | 13 | $Y_2O_3$ | $Pr_6O_{11}$ | | 5:5 | 60/40 | 0.8 |
| | 14 | $Y_2O_3$ | | | 7.5:0 | 100/0 | 0.6 |
| | 15 | $Er_2O_3$ | | | 10:0 | 100/0 | 0.5 |
| | 16 | $Er_2O_3$ | $Y_2O_3$ | | 10:5 | 55/45 | 1.5 |
| | 17 | $Y_2O_3$ | $Yb_2O_3$ | | 2.5:2.5 | 65/35 | 0.3 |

| No. | | Firing temperature (°C.) | Atmosphere pressure (atm) | Time (hr) | Bulk density (g/cm³) | Four point bending strength (MPa) RT | Four point bending strength (MPa) 1400° C. | Crystal-*** line phase in intergranular phase |
|---|---|---|---|---|---|---|---|---|
| Present invention | 1 | 2000 | 50 | 2 | 3.33 | 670 | 540 | H |
| | 2 | 1900 | 10 | 2 | 3.31 | 700 | 520 | H |
| | 3 | 1900 | 10 | 2 | 3.30 | 730 | 580 | H |
| | 4 | 1950 | 15 | 2 | 3.42 | 750 | 520 | H |
| | 5 | 1950 | 15 | 2 | 3.35 | 690 | 500 | H |
| | 6 | 1900 | 10 | 2 | 3.44 | 700 | 500 | H |
| | 7 | 1950 | 15 | 2 | 3.28 | 720 | 530 | H |
| | 8 | 2100 | 100 | 1 | 3.48 | 700 | 550 | H |
| | 9 | 1700 | 1 | 8 | 3.25 | 600 | 500 | H |
| Comparative Example | 10 | 1900 | 10 | 2 | 3.25 | 620 | 330 | H |
| | 11 | 1900 | 10 | 2 | 3.02 | —* | — | |
| | 12 | 1950 | 100 | 2 | 3.28 | 650 | 230 | H |
| | 13 | 1950 | 100 | 2 | 3.27 | 550 | 260 | H |
| | 14 | 1850 | 10 | 2 | 3.20 | 580 | 240 | H |
| | 15 | 1850 | 10 | 2 | 3.35 | 600 | 190 | H |
| | 16 | 1900 | 10 | 2 | 3.15 | —* | — | |
| | 17 | 1900 | 10 | 2 | 3.25 | 580 | 240 | H + S |

*Insufficient densification
**①/②/③
***H: apatite structure,
S: $Ln_2Si_2O_7$ (Ln: Rare earth element)

As is clear from Tables 1(a) and 1(b), not less than two kinds of the rare earth element compounds of $Y_2O_3$, $Er_2O_3$, $Tm_2O_3$, $Yb_2O_3$, and $Lu_2O_3$ are added as the additive in the present invention such that any one of the selected oxides of the rare earth elements as the additives is not more than 95 mol% that is, 95/5 to 5/95 molar ratio of the total addition amount of the rare earth element oxides; the total molar addition amount of the selected rare earth element oxides is from 0.4 to 1.3 times the molar amount of $SiO_2$ which is obtained by converting the content of oxygen contained in the sintered body to the molar amount of $SiO_2$; as shown in the photograph of FIG. 2, the intergranular phase is substantially crystallized, and is composed of the crystalline phase of the apatite structure; and the silicon nitride sintered bodies have high strength at 1,400° C. In all the silicon nitride sintered bodies outside the scope of the present invention, that is, the silicon nitride sintered bodies (Nos. 10 to 13) using other compounds as the rare earth elements additives than $Y_2O_3$, $Er_2O_3$, $Tm_2O_3$, $Yb_2O_3$ and $Lu_2O_3$, the sintered bodies (Nos. 14 to 15) added with a single rare earth element oxide, and the sintered bodies (Nos. 16 to 17) in which the total addition molar amount of the rare earth element oxides ot the molar amount of $SiO_2$ is outside the scope of the present invention, the strength at 1,400° C. was low or sufficient densification was not obtained.

The silicon nitride sintered body Nos. 1–9 according to the present invention each containing $Y_2O_3$, $Er_2O_3$, $Tm_2O_3$, $Yb_2O_3$ and/or $Lu_2O_3$ in the range limited in the present invention had the intergranular phase composed of the apatite structure crystalline phase, and exhibited high strength at 1,400° C. being not less than 500 MPa.

EXAMPLE 2

A raw material powder of $Si_3N_4$ containing 0.1% by weight of metallic or cationic element impurities of C, Al, Fe, Mg, Ca, etc. and 1.7% by weight of oxygen and having an average grain size of 0.5 $\mu m$ and a BET specific surface area of 15 $m^2/g$, and a $Y_2O_3$-$Yb_2O_3$ additive shown in Table 2 and having a purity of 99.9% by weight and an average grain size of 0.3 to 2 $\mu m$ or an $Er_2O_3$-$Yb_2O_3$ additive shown in Table 3 were mixed. By using a nylon vessel having an inner volume of 1.2 liters, 200 grams of a thus formulated raw material was added with 1.2 kg of grinding media made of silicon nitride base procelain and 500 ml of water, which was milled at a vibration frequency of 1,200 times/min in a vibration mill for 10 hours. Then, the water was evaporated and the milled raw material was granulated to a grain size of 100 $\mu m$ as a molding powder. Next, the thus granulated molding powder was isostatically pressed at a pressure of 3 tons/$cm^2$ to prepare a molding of 60×60×6 mm, which was fired at 1,900° C. in an $N_2$ atmosphere of 10 atm for 2 hours. Further, the fired product was crystallized at 1,400° C. for 6 hours, thereby obtaining silicon nitride sintered body Nos. 21 to 28 and 31 to 37 according to the present invention. The same raw material was used, and an additive as in Table 2 or 3 was added thereinto as shown therein in Tables 2 and 3. The thus obtained powder was similarly subjected to milling, granulating, molding and firing in the same firing conditions as in the present invention, thereby obtaining silicon nitride sintered body Nos. 29, 30 and 38 as Comparative Examples.

With respect to the sintered body Nos. 21 to 38, the content of oxygen in the sintered body was determined by a chemical analysis, and the amount of oxygen incorporated into the sintered body through addition of the additive of the rare earth element oxides was subtracted therefrom. Then, the remaining amount of oxygen was converted into a molar amount of $SiO_2$. The ratio between the total addition molar amount of the oxides and the molar amount of $SiO_2$ is shown in Tables 2 and 3. The bulk densities of the sintered bodies, the crystalline phase of the intergranular phase, and four point bending strengths at room temperature and 1,400° C. were determined as in Example 1 and are shown in Tables 2 and 3.

The ratio of H phase in Tables 2 and 3 means the integrated intensity of the crystalline phase having the apatite structure relative to the sum of integrated intensities of largest peaks of intergranular crystalline phases of $Yb_2SiO_5$:(204) face, $Ln_2Si_2O_7$:(021) face, $Ln_4Si_2O_7N_2$:(131) face, and apatite:(211) face excluding $\beta$-$Si_3N_4$. Ln means a rare earth element.

TABLE 2

| | No. | Additive (wt %) ① $Y_2O_3$ | Additive (wt %) ② $Yb_2O_3$ | Molar ratio ①/② | Molar ratio (① + ②)/$SiO_2$ | Bulk density (g/$cm^3$) | Four point bending strength (MPa) RT | Four point bending strength (MPa) 1400° C. | Crystalline phase in intergranular phase | Percentage of H phase (%) |
|---|---|---|---|---|---|---|---|---|---|---|
| Present | 21 | 8.0 | 0.8 | 95/5 | 0.9 | 3.12 | 600 | 500 | H | 100 |
| inven- | 22 | 6.8 | 1.9 | 85/15 | 1.2 | 3.11 | 620 | 560 | H | 100 |
| tion | 23 | 5.7 | 3.8 | 70/30 | 1.1 | 3.13 | 590 | 530 | H | 100 |
| | 24 | 4.4 | 5.3 | 60/40 | 1.0 | 3.31 | 600 | 550 | H | 100 |
| | 25 | 3.9 | 7.0 | 50/50 | 1.0 | 3.35 | 640 | 570 | H + S | 90 |
| | 26 | 2.2 | 9.4 | 30/70 | 0.8 | 3.38 | 700 | 640 | H + S | 90 |
| | 27 | 1.0 | 11.5 | 15/85 | 0.6 | 3.40 | 670 | 580 | H + S | 80 |
| | 28 | 0.4 | 12.2 | 5/95 | 0.9 | 3.43 | 650 | 570 | H + S | 80 |
| Compar- | 29 | 8.0 | 0.0 | 100/0 | 0.8 | 3.14 | 500 | 270 | H | 100 |
| ative Example | 30 | 0.0 | 13.1 | 0/100 | 0.9 | 3.45 | 580 | 320 | S + T | 0 |

T: $Yb_2SiO_5$,
S: $Ln_2Si_2O_7$(Ln: Rare earth element),
H: apatite structure

TABLE 3

| | No. | Additive (wt %) ① $Er_2O_3$ | Additive (wt %) ② $Yb_2O_3$ | Molar ratio ①/② | Molar ratio (① + ②)/$SiO_2$ | Bulk density (g/$cm^3$) | Four point bending strength (MPa) RT | Four point bending strength (MPa) 1400° C. | Crystalline phase in intergranular phase | Percentage of H phase (%) |
|---|---|---|---|---|---|---|---|---|---|---|
| Present | 31 | 11.0 | 1.8 | 85/15 | 0.8 | 3.44 | 510 | 500 | H + S + J | 80 |
| inven- | 32 | 9.3 | 3.6 | 75/25 | 0.7 | 3.42 | 540 | 510 | " | 80 |
| tion | 33 | 7.4 | 5.4 | 60/40 | 0.5 | 3.43 | 480 | 500 | " | 80 |

TABLE 3-continued

| | No. | Additive (wt %) ① Er₂O₃ | ② Yb₂O₃ | Molar ratio ①/② | Molar ratio (① + ②)/SiO₂ | Bulk density (g/cm³) | Four point bending strength (MPa) RT | 1400° C. | Crystalline phase in intergranular phase | Percentage of H phase (%) |
|---|---|---|---|---|---|---|---|---|---|---|
| | 34 | 6.2 | 6.8 | 50/50 | 0.8 | 3.43 | 600 | 570 | " | 70 |
| | 35 | 3.7 | 9.3 | 30/70 | 1.2 | 3.43 | 610 | 550 | " | 70 |
| | 36 | 1.8 | 11.5 | 15/85 | 1.1 | 3.43 | 570 | 550 | " | 70 |
| | 37 | 0.7 | 13.0 | 5/95 | 10 | 3.43 | 600 | 550 | " | 70 |
| Comparative Example | 38 | 12.8 | 0.0 | 100/0 | 1.0 | 3.42 | 480 | 300 | H | 100 |

J: :Ln₄Si₂O₇N₂,
S: Ln₂Si₂O₇(Ln: Rare earth element),
H: apatite structure

As is clear from Tables 2 and 3, strength not less than 500 MPa at 1,400° C. was obtained in Sample Nos. 21 to 28 and 31 to 37 in which any one kind of the oxides of the rare earth elements included in the scope of the present invention is not more than 95 mol%, that is, from 95/5 to 5/95 molar ratio with respect to the total addition amount of the oxides of the rare earth elements. Further, Samples Nos. 25 to 28 and Nos. 34 to 37 in which Yb₂O₃ is from 50 to 95 mol% were of a strength of not less than 550 MPa at 1,400° C. A strength of not less than 570 MPa at 1,400° C. was obtained in Sample Nos. 25 to 28 in which Y₂O₃/Yb₂O₃=50/50 to 5/95.

The silicon nitride sintered body Nos. 25 to 28 according to the present invention had excellent oxidation resistance in that the weight increment after an oxidizing test at 1,400° C. in open air for 100 hours was from 0.1 to 0.2 mg/cm², and they also have excellent creep resistance in that the creep rate at 1,400° C. in open air under a load stress of 200 MPa was 1 to $3 \times 10^{-5} h^{-1}$.

EXAMPLE 3

A raw material powder of Si₃N₄ containing 0.1% by weight of metallic or cationic element impurities such as C, Al, Mg, Fe, Ca, etc. and 1.7% by weight of oxygen and having an average grain size of 0.5 μm and a BET specific surface area of 15 m²/g and a Y₂O₃-Yb₂O₃ additive as shown in Table 4 having a purity of 99.9% by weight and an average grain size of 0.3 to 2 μm were mixed together. By using a nylon vessel having an inner volume of 1.2 liters, 200 g of the formulated raw material was added with 1.2 kg of grinding media made of silicon nitride base procelain and 500 ml of water. The resulting mixture was milled in a vibration mill at a vibration frequency of 1,200 times per minute for 10 hours. The water was evaporated and the thus milled powder was granulated to a grain size of 100 μm, thereby obtaining a molding powder. Next, a molding of 60×60×6 mm was prepared in an isostatic press under a pressure of 3 ton/cm². Samples shown in Table 4 were fired at 1,900° C. in a N₂ atmosphere of 10 atm for 2 hours, and then crystallized at 1,400° C. for 6 hours, thereby obtaining silicon nitride sintered body Nos. 41 to 43 according to the present invention. The same material was used, and an additive as shown in Table 4 was mixed as shown in Table 4. Then, the thus formulated powder was similarly subjected to the milling, granulating and molding. Then, the molding was fired under the same firing conditions as in the above products according to the present invention and similarly crystallized, thereby obtaining silicon nitride sintered body Nos. 44 and 45 as Comparative Examples.

With respect to the sintered body Nos. 41 to 45, the content of oxygen in the sintered body was determined by a chemical analysis, the amount of oxygen incorporated into the sintered body through addition of the additive of the oxides of the rare earth elements was subtracted therefrom, thereby determining the residual oxygen content as an amount of SiO₂. The ratio between the total addition molar amount and the molar amount of SiO₂ is shown in Table 4. The bulk densities of the sintered bodies, the crystalline phase of the intergranular phase, four point bending strengths at room temperatures and 1,400° C. were determined similarly to Example 1, and the ratio of the H phase was determined similarly to Example 2. Results are shown in Table 4.

TABLE 4

| | No. | Additive (wt %) ① Y₂O₃ | ② Yb₂O₃ | Molar ratio ①/② | Molar ratio (① + ②)/SiO₂ | Bulk density (g/cm³) | Four point bending strength (MPa) RT | 1400° C. | Crystalline phase in intergranular phase | Percentage of H phase (%) |
|---|---|---|---|---|---|---|---|---|---|---|
| Present invention | 41 | 1.8 | 7.7 | 30/70 | 0.4 | 3.32 | 630 | 510 | H + S | 70 |
| | 42 | 2.4 | 10.0 | " | 0.8 | 3.35 | 610 | 530 | H + J | 80 |
| | 43 | 2.8 | 12.2 | " | 1.3 | 3.36 | 560 | 500 | H + J | 50 |
| Comparative Example | 44 | 1.6 | 6.5 | " | 0.3 | 3.30 | 600 | 210 | H + S | 40 |
| | 45 | 3.2 | 13.0 | " | 1.5 | 3.28 | 560 | 350 | H + J | 40 |

J: :Ln₄Si₂O₇N₂,
S: Ln₂Si₂O₇(Ln: Rare earth element),
H: apatite structure

As is clear from Table 4, a strength of not less than 500 MPa at 1,400° C. was obtained in Sample Nos. 41 to 43 according to the present invention in which the ratio of the total addition molar amount of the oxides of the rare earth elements to the molar amount of SiO₂ was from 0.4 to 1.3. To the contrary, Comparative Example Nos. 44 and 45 in which the molar ratio is outside the scope of the present invention has a ratio of the H phase being of not more than 50% and low strength at high temperatures.

EXAMPLE 4

A low oxygen content raw material powder of $Si_3N_4$ containing 0.1% by weight of metallic or cationic element impurities such as C, Al, Fe, Ca, etc. and 1.0% by weight of oxygen and having an average grain size of 0.6 μm and a BET specific surface area of 10 m²/g and an additive as shown in Table 5 having a purity of 99.9% by weight and an average grain size of 0.3 to 2 μm were mixed together as shown in Table 5, and 1.2 kg of grinding media made of silicon nitride base porcelain and 500 ml of water were added to 200 g of the thus mixed raw material by using a 1.2 liter inner volume vessel made of nylon, which was milled in a vibration mill at a vibration frequency of 1,200 times/minute for 10 hours. Then, the water was evaporated and the milled powder was granulated to a grain size of 100 μm, thereby obtaining a molding powder. Next, a molding of 60×60×6 mm was prepared by isostatically pressing the molding powder under a pressure of 3 ton/cm². The molding was fired at 1,900° C. in an $N_2$ atmosphere of 10 atm for 6 hours and further cyrstallized at 1,400° C. for 6 hours, thereby obtaining silicon nitride sintered body Nos. 51 and 52 according to the present invention. In the meanwhile, the same raw material was used, and an additive as shown in Table 5 was mixed thereinto as shown in Table 5, followed by similarly milling, granulating, and molding and then firing in the same firing conditions as in the products according to the present invention, thereby obtaining similarly crystallized silicon nitride sintered body Nos. 53 and 54 as Comparative Examples.

With respect to the sintered body Nos. 51 to 54, the content of oxygen in the sintered body was determined by a chemical analysis and the amount of oxygen incorporated into the sintered body through addition of the additive of the oxides of the rare earth elements was subtracted therefrom. The remaining content of oxygen was converted to a molar amount of $SiO_2$.

The ratio between the total addition molar amount and the molar amount of $SiO_2$ is shown in Table 5. The bulk densities of the sintered bodies, the crystalline phase of the intergranular phase, and four point bending strengths at room temperature and 1,400° C. were determined similarly to Example 1 and the ratio of the H phase was obtained similarly to Example 2. Results are shown in Table 5.

As is clear from Table 5, as in Example 3, strength of not less than 500 MPa at 1,400° C. was obtained in Sample Nos. 51 and 52 according to the present invention in which the molar ratio was from 0.4 to 1.3 and $Si_3N_4$ raw material having a low content of oxygen was used. To the contrary, in Comparative Example Nos. 53 and 54 having the molar ratio outside the scope of the present invention, the ratio of the H phase was not more than 50% and strength at high temperatures was low.

The present invention is not limited to the above-mentioned Examples, but a variety of modifications and changes could be made. For instance, although the rare earth elements are added in the form of oxides in the above-mentioned Examples, the rare earth elements may be added in the form of a nitride, a chloride, a hydroxide, a carbonate, a sulfate, a nitrate or the like so long as the intergranular phase is crystallized into the apatite structure at substantially the same mixing ratio of the rare earth element oxides as in the present invention.

As evident from the above detailed explanation, according to the silicon nitride sintered bodies and the manufacturing method thereof in the present invention, a specific additive which is adjusted at a specified molar ratio is used so that the silicon nitride sintered bodies having a high strength of not less than 500 MPa at high temperatures (1,400° C.) are obtained accroding to the atmospheric pressure or pressurized atmosphere sintering method. Therefore, the present invention can be favorably applied to structural materials for items such as gas turbine parts, etc. which have complicated shapes.

What is claimed is:

1. A silicon nitride sintered body having a four point bending strength of at least 500 MPa at 1,400° C. and consisting essentially of Si, O, N and at least two rare earth elements selected from the group consisting of Y, Er, Tm, Yb, and Lu, $Si_3N_4$ comprising not less than 70% by weight of said body wherein (1) the ratio of the molar amount of all the rare earth elements contained in said sintered body calculated as moles of $Ln_2O_3$, Ln being a rare earth element selected from the group consisting of Y, Er, Tm, Yb, and Lu divided by the molar amount of oxygen calculated as moles of $SiO_2$ is within the range of from 0.4 to 1.3, said amount of oxygen calculated as moles of $SiO_2$ being obtained by subtracting the amount of oxygen contained in the $Ln_2O_3$, all the rare earth elements contained in said sintered body being considered as molecules of $Ln_2O_3$, from the amount of oxygen contained in said sintered body and considering the remaining amount of oxygen as moles of $SiO_2$; (2) none of the rare earth elements contained in said sintered body accounts for more than 95 mol% of all the rare earth elements contained in the sintered body; and (3) an intergranular phase of $Si_3N_4$ grains contained in said sintered body is substantially of a

TABLE 5

| | | Additive (wt %) | | Molar ratio | Molar ratio | Bulk density | Four point bending strength (MPa) | | Crystalline phase in intergranular | Percentage of H phase |
| | No. | ① $Y_2O_3$ | ② $Yb_2O_3$ | ①/② | (① + ②)/$SiO_2$ | (g/cm³) | RT | 1400° C. | phase | (%) |
|---|---|---|---|---|---|---|---|---|---|---|
| Present invention | 51 | 2.5 | 3.0 | 60/40 | 0.5 | 3.23 | 660 | 530 | H + S | 70 |
| | 52 | 1.5 | 4.7 | 35/65 | 1.1 | 3.18 | 620 | 500 | H | 100 |
| Comparative Example | 53 | 4.4 | 3.3 | 70/30 | 1.5 | 2.90 | —* | — | — | — |
| | 54 | 1.0 | 2.0 | 45/55 | 0.3 | 3.21 | 600 | 320 | S + H | 30 |

S: $Ln_2Si_2O_7$(Ln: Rare earth element),
H: apatite structure,
*Insufficient densification crystalline phase, at least 50% of which is of an apatite structure.

2. A silicon nitride sintered body according to claim 1, wherein at least Yb as a rare earth element is contained in an amount of 50 to 95 mol% of all the rare earth elements.

3. A silicon nitride sintered body according to claim 2, wherein the rare earth elements comprise Y and Yb.

4. A process for manufacturing silicon nitride sintered bodies having a four point bending strength of at least 500 Mpa at 1,400° C., which comprises preparing a mixed powder consisting essentially of a raw material powder of a silicon nitride raw powder and two or more kinds of rare earth element oxides selected from the group consisting of $Y_2O_3$, $Er_2O_3$, $Tm_2O_3$, $Yb_2O_3$, and $Lu_2O_3$, molding said mixed powder, and then firing the thus obtained molding at 1,700° C. to 2,100° C. at atmospheric pressure or in a pressurized $N_2$ atmosphere, said process further comprising determining a total amount of said two or more kinds of rare earth element oxides to be mixed with said silicon nitride raw powder so that the ratio of the total molar amount of the selected rare earth element oxides divided by the molar amount of $SiO_2$, obtained by calculating as $SiO_2$ all oxygen contained in said sintered body excluding oxygen introduced into the sintered body from the added rare earth element oxides, is within the range of from 0.4 to 1.3, wherein none of said selected rare earth element oxides comprises more than 95 mol% of the total addition amount of the oxides of the rare earth elements.

5. A process for manufacturing a silicon nitride sintered body having a four point banding strength of at least 500 MPa at 1,400° C., comprising:
  (a) preparing a mixed powder consisting essentially of a silicon nitride raw powder and at least two rare earth element oxides selected from the group consisting of $Y_2O_3$, $Er_2O_3$, $Tm_2O_3$, $Yb_2O_3$ and $Lu_2O_3$;
  (b) molding said mixed powder; and
  (c) firing the thus obtained molding at 1700° C. to 2100° C. at atmospheric pressure or in a pressurized $N_2$ atmosphere, wherein:
  (1) the ratio of the total molar amount of said at least two rare earth oxides divided by the molar amount of $SiO_2$ is from 0.4 to 1.3, the amount of $SiO_2$ being determined by measuring the total amount of oxygen in the body, subtracting therefrom the amount of oxygen contained in said at least two rare earth oxides, and considering that amount of oxygen to be present as $SiO_2$; and
  (2) none of said rare earth oxides comprises more than 95 mol% of the rare earth oxides contained in the body.

* * * * *